United States Patent
Mukaitani et al.

(10) Patent No.: US 11,384,972 B2
(45) Date of Patent: Jul. 12, 2022

(54) FREE COOLING SYSTEM

(71) Applicant: Mitsubishi Electric Corporation, Tokyo (JP)

(72) Inventors: Naoya Mukaitani, Tokyo (JP); Takahito Hikone, Tokyo (JP); Yoshio Yamano, Tokyo (JP); Kimitaka Kadowaki, Tokyo (JP); Takuya Ito, Tokyo (JP); Yasushi Okoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/254,940

(22) PCT Filed: Aug. 17, 2018

(86) PCT No.: PCT/JP2018/030533
§ 371 (c)(1),
(2) Date: Dec. 22, 2020

(87) PCT Pub. No.: WO2020/035942
PCT Pub. Date: Feb. 20, 2020

(65) Prior Publication Data
US 2021/0123650 A1    Apr. 29, 2021

(51) Int. Cl.
*F25B 49/02* (2006.01)
*F25B 6/02* (2006.01)
(Continued)

(52) U.S. Cl.
CPC .............. *F25B 49/027* (2013.01); *F24F 1/68* (2013.01); *F24F 11/30* (2018.01); *F24F 11/46* (2018.01);
(Continued)

(58) Field of Classification Search
CPC .... F25B 6/02; F25B 49/027; F25B 2339/047; F24F 1/06; F24F 1/68; Y02B 30/54
See application file for complete search history.

(56) References Cited

U.S. PATENT DOCUMENTS

| 4,463,574 A | 8/1984 | Spethmann et al. |
| 2015/0184885 A1* | 7/2015 | Prins .................. G05D 23/1919 62/98 |

(Continued)

FOREIGN PATENT DOCUMENTS

| EP | 03309475 A1 | 4/2018 |
| JP | S60-2198 U | 1/1985 |

(Continued)

OTHER PUBLICATIONS

The Extended European Search Report dated Jul. 15, 2021 issued in corresponding EP application No. 18930228.4.
(Continued)

*Primary Examiner* — Jonathan Bradford
(74) *Attorney, Agent, or Firm* — Posz Law Group, PLC

(57) ABSTRACT

A free cooling system includes a plurality of free cooling outdoor units each including a heat medium circuit, a controller, and a communication unit, the heat medium circuit being configured by connecting a heat medium pump, a first heat exchanger, and a heat source side of a second heat exchanger by pipes, a heat medium circulating in the heat medium circuit, the controller configured to control the heat medium pump, and the communication units performing communication with each other, wherein the plurality of free cooling outdoor units are coupled with each other by a load pipe that allows a load heat medium to flow to or flow out from a load side of each second heat exchanger.

2 Claims, 6 Drawing Sheets

(51) Int. Cl.
  *F24F 1/68*     (2011.01)
  *F24F 11/46*    (2018.01)
  *F24F 11/83*    (2018.01)
  *F24F 11/30*    (2018.01)
  *F24F 11/85*    (2018.01)
  *F24F 140/20*   (2018.01)
  *F24F 1/06*     (2011.01)

(52) U.S. Cl.
  CPC .............. *F24F 11/83* (2018.01); *F24F 11/85* (2018.01); *F25B 6/02* (2013.01); *F24F 1/06* (2013.01); *F24F 2140/20* (2018.01); *F25B 2339/047* (2013.01); *Y02B 30/54* (2013.01)

(56) References Cited

U.S. PATENT DOCUMENTS

2017/0268792 A1    9/2017  Costakis et al.
2018/0160570 A1*   6/2018  Bailey ................ H05K 7/20827

FOREIGN PATENT DOCUMENTS

| JP | 2012-072921 A  | 4/2012  |
| JP | 2013-019591 A  | 1/2013  |
| JP | 2016-194386 A  | 11/2016 |
| JP | 2016/199238 A1 | 12/2016 |
| JP | 6141089 B2     | 6/2017  |
| JP | 2017-138025 A  | 8/2017  |

OTHER PUBLICATIONS

Office Action dated Aug. 3, 2021 issued in corresponding JP application No. 2020-537345 (and English translation).
International Search Report of the International Searching Authority dated Nov. 6, 2018 for the corresponding International application No. PCT/JP2018/030533 (and English translation).

* cited by examiner

FREE COOLING SYSTEM

CROSS REFERENCE TO RELATED APPLICATION

This application is a U.S. national stage application of PCT/JP2018/030533 filed on Aug. 17, 2018, the contents of which are incorporated herein by reference.

TECHNICAL FIELD

The present disclosure relates to a free cooling system that includes a plurality of free cooling outdoor units.

BACKGROUND ART

Hitherto, the condenser of a refrigerator used in air conditioning equipment in a building or other facility is cooled by cooling water. A cooling tower used for cooling such cooling water is known (see Patent Literature 1, for example). The capacity of such a cooling tower is determined depending on the maximum amount of load at a place of installation.

CITATION LIST

Patent Literature

Patent Literature 1: Japanese Utility Model Laid-Open No. S60-2198

SUMMARY OF INVENTION

Technical Problem

A load fluctuates depending on conditions, such as an outside air temperature and setting of air conditioning equipment. However, in the related-art cooling tower disclosed in Patent Literature 1, the same operation is performed irrespective of the fluctuation of load. Therefore, the related-art cooling tower has a problem that energy is wastefully consumed under some conditions.

The present disclosure has been made to solve the above-mentioned problem, and an object thereof is to provide a free cooling system that can achieve energy saving.

Solution to Problem

A free cooling system according to an embodiment of the present disclosure includes a plurality of free cooling outdoor units each including a heat medium circuit, a controller, and a communication unit, the heat medium circuit being configured by connecting a heat medium pump, a first heat exchanger, and a heat source side of a second heat exchanger by pipes, a heat medium circulating through the heat medium circuit, the controller configured to control the heat medium pump, the communication units performing communication with each other, wherein the plurality of free cooling outdoor units are coupled with each other by a load pipe that allows a load heat medium to flow to or flow out from a load side of each of the second heat exchangers.

Advantageous Effects of Invention

The free cooling system according to the embodiment of the present disclosure includes the plurality of free cooling outdoor units, and the free cooling outdoor units communicate with each other via the communication units. Therefore, fine control can be performed depending on a load and hence, energy saving can be achieved.

DESCRIPTION OF EMBODIMENTS

Hereinafter, Embodiment of the present disclosure will be described with reference to drawings. The present disclosure is not limited by Embodiment described hereinbelow. In addition, the relationship of sizes of the components in the following drawings may differ from the actual one.

Embodiment

Figure 1:
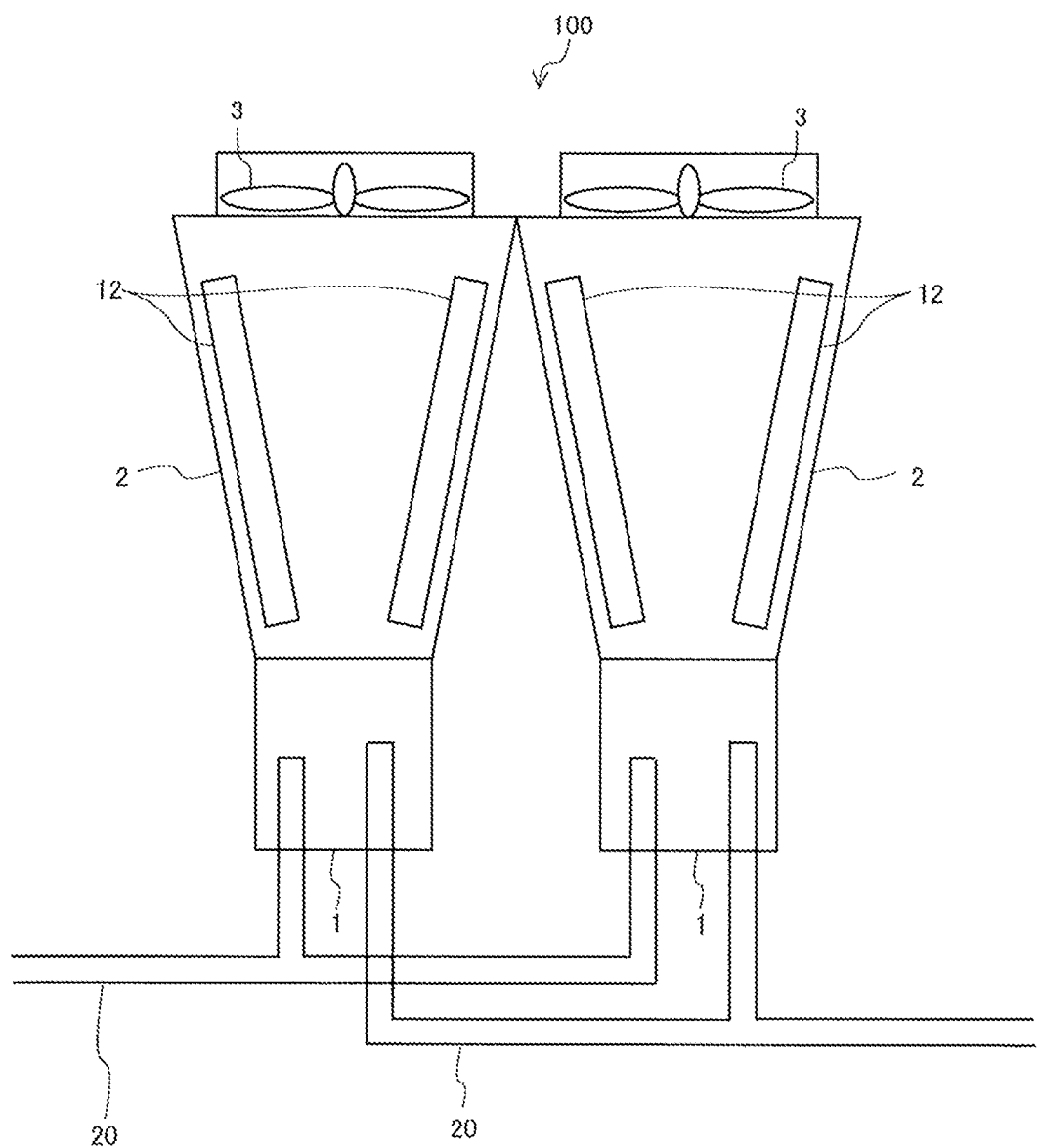
FIG. 1 is an external appearance schematic view of a free cooling system according to Embodiment of the present disclosure.
Figure 2:
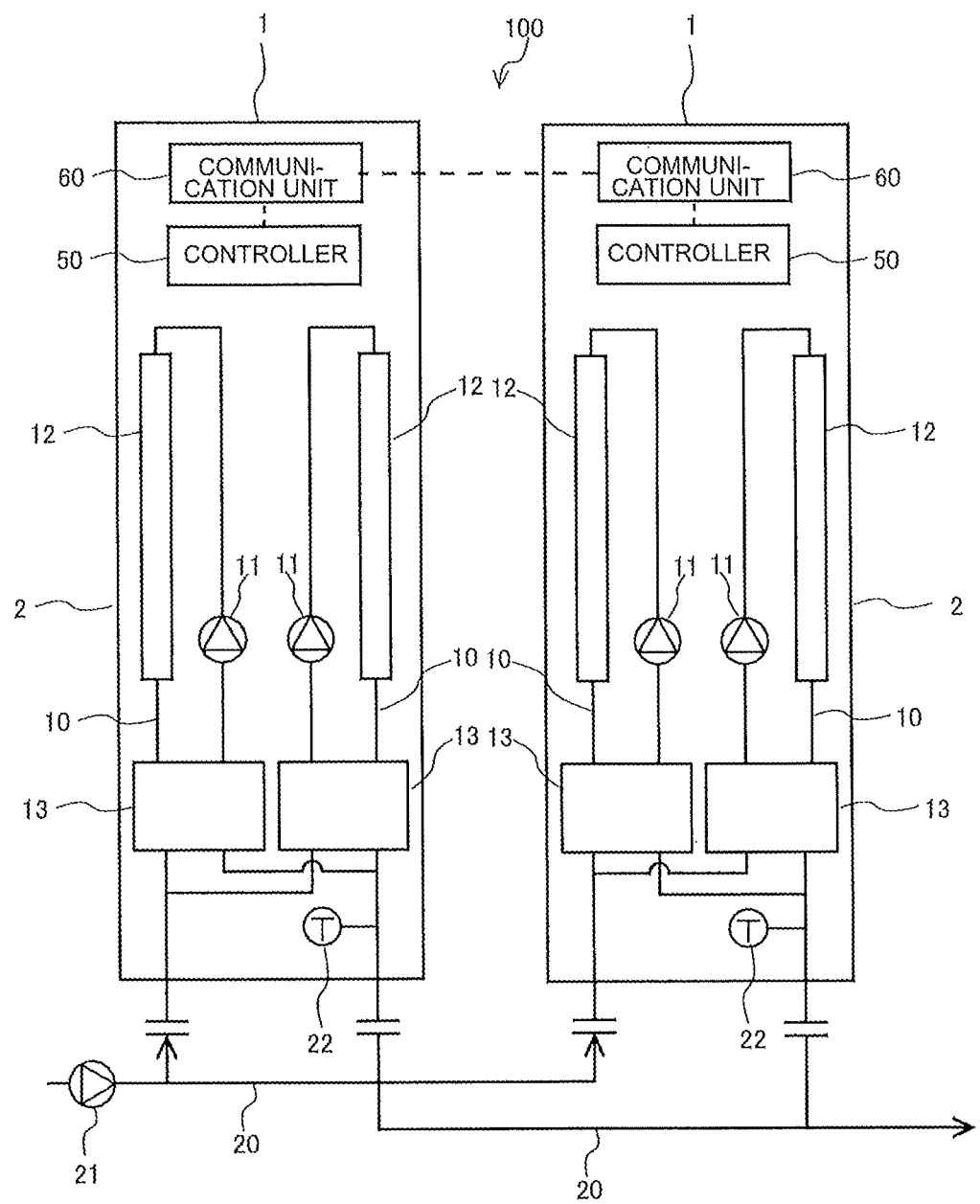
FIG. 2 is a configuration diagram of the free cooling system according to Embodiment of the present disclosure.
Figure 3:
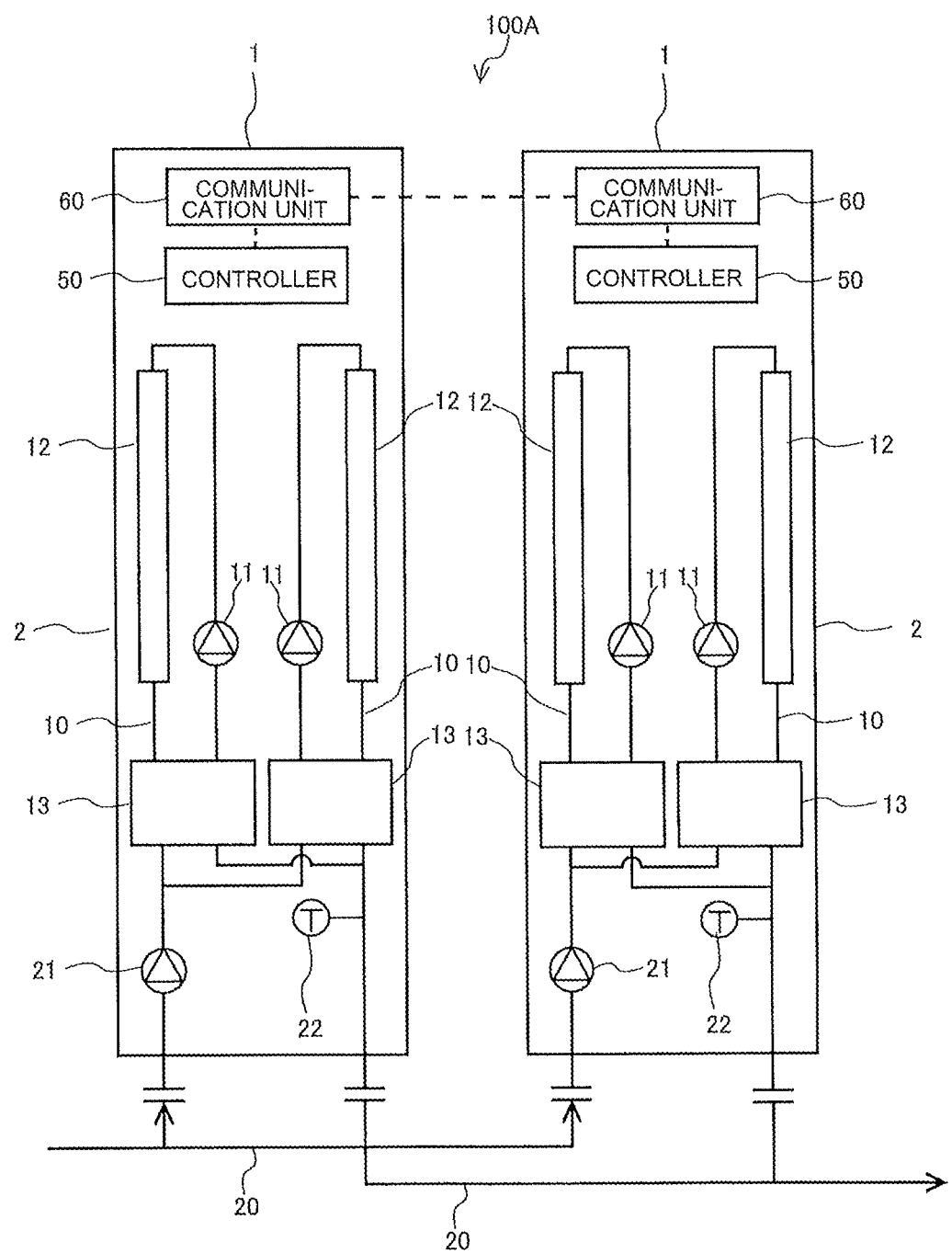
FIG. 3 is a configuration diagram of a first modification of the free cooling system according to Embodiment of the present disclosure.
Figure 4:
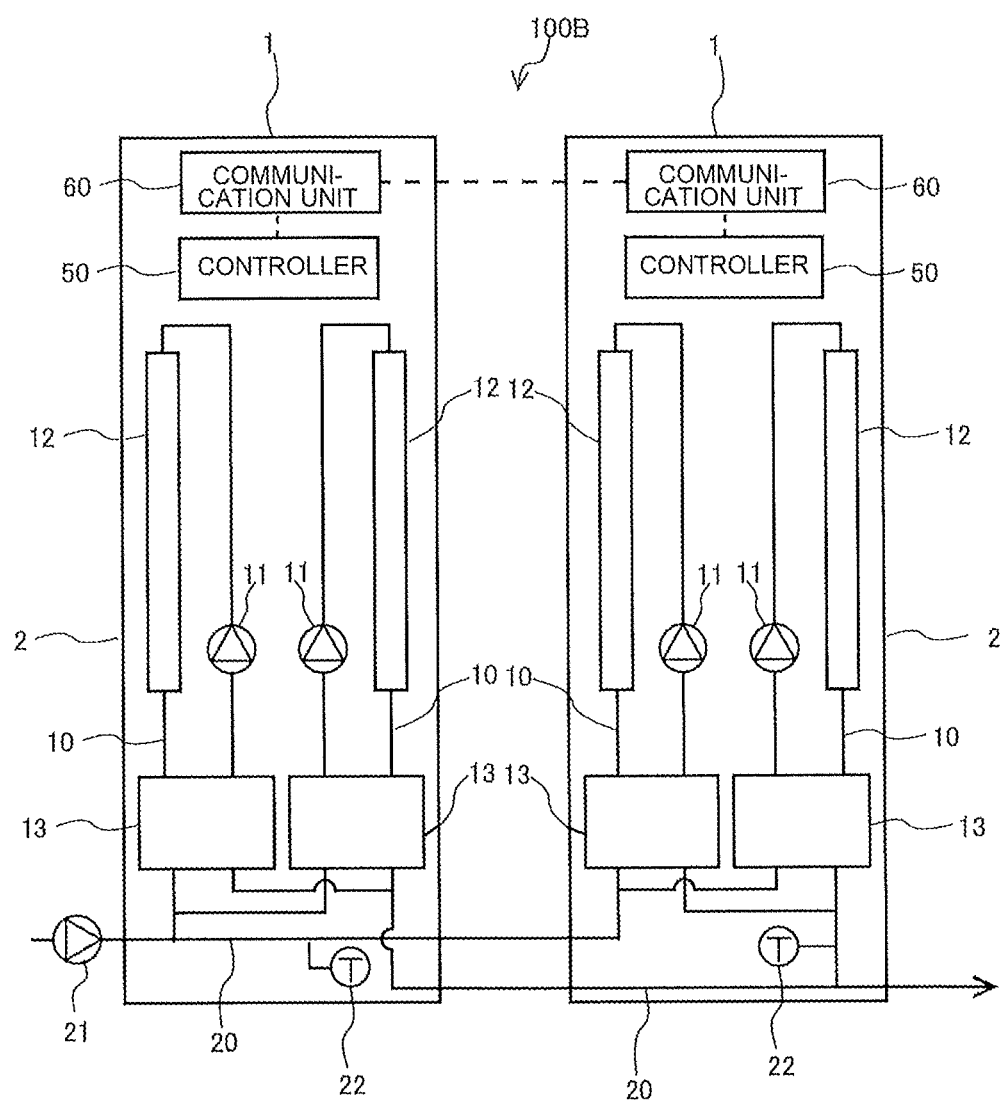
FIG. 4 is a configuration diagram of a second modification of the free cooling system according to Embodiment of the present disclosure.

FIG. 1 is an external appearance schematic view of a free cooling system 100 according to Embodiment of the present disclosure. FIG. 2 is a configuration diagram of the free cooling system 100 according to Embodiment of the present disclosure. FIG. 3 is a configuration diagram of a first modification of the free cooling system 100 according to Embodiment of the present disclosure. FIG. 4 is a configuration diagram of a second modification of the free cooling system 100 according to Embodiment of the present disclosure.

FIG. 1 is a side view of free cooling outdoor units 1, and FIG. 2 to FIG. 4 are plan views of the free cooling outdoor units 1. FIG. 1 to FIG. 4 show a state where two free cooling outdoor units 1 are coupled with each other. However, the number of free cooling outdoor units 1 is not limited to two, and three or more free cooling outdoor units 1 may be coupled with each other.

As shown in FIG. 1, the free cooling system 100 according to Embodiment is formed such that the plurality of free cooling outdoor units 1 are coupled with each other by load pipes 20.

As shown in FIG. 2, each free cooling outdoor unit 1 includes heat medium circuits 10 each of which performs a free cooling operation, the load pipes 20 through which a load heat medium being an object to be cooled flows, a controller 50, and a communication unit 60. The load heat medium may be water, for example. The free cooling outdoor unit 1 according to Embodiment includes two heat medium circuits 10. However, the number of heat medium circuits 10 is not limited to two. It is sufficient for the free cooling outdoor unit 1 to include at least one heat medium circuit 10.

The heat medium circuit 10 is configured by connecting a heat medium pump 11, a first heat exchanger 12, and the heat source side of a second heat exchanger 13 in sequence by pipes, and a heat medium cycles through the circuit. The heat medium may be brine obtained by mixing an additive for lowering a freezing point into water, for example. Further, a fan 3 that sends air to the first heat exchangers 12 is provided in the vicinity of the first heat exchangers 12.

The load pipes 20 are provided for allowing the load heat medium to flow therethrough. As shown in FIG. 2, the free cooling outdoor units 1 are coupled with each other on sides thereof by the load pipes 20 as viewed in a front view. Further, a load pump 21 is provided to the load pipe 20 at a position near the inflow side of the free cooling outdoor unit 1.

The free cooling system 100 according to Embodiment has the configuration where one load pump 21 is provided to the load pipe 20 at a position near the inflow side of the free cooling outdoor unit 1. However, the configuration of the free cooling system 100 is not limited to such a configuration. As in the case of a free cooling system 100A shown in FIG. 3, it may be configured such that each of the free cooling outdoor units 1 includes the load pump 21 in a housing 2, and this load pump 21 is provided to the load pipe 20 at a position near the inflow side of the free cooling outdoor unit 1 through which the load heat medium flows into the free cooling outdoor unit 1. With such a configuration, it becomes possible to control the flow of the load heat medium for each free cooling outdoor unit 1.

In the free cooling system 100 according to Embodiment, the free cooling outdoor units 1 are coupled with each other on the sides thereof by the load pipes 20 as viewed in a front view. However, the configuration of the free cooling system 100 is not limited to such a configuration. As in the case of free cooling systems 100B, 100C shown in FIG. 4 and FIG. 5, it may be configured such that the free cooling outdoor units 1 are coupled with each other on lateral sides thereof by the load pipes 20 as viewed in a front view. With such a configuration, the load pipes 20 are housed in a space between the free cooling outdoor units 1, thus being prevented from protruding from the side surfaces of the free cooling outdoor units 1. Therefore, a service space can be ensured.

Figure 5:
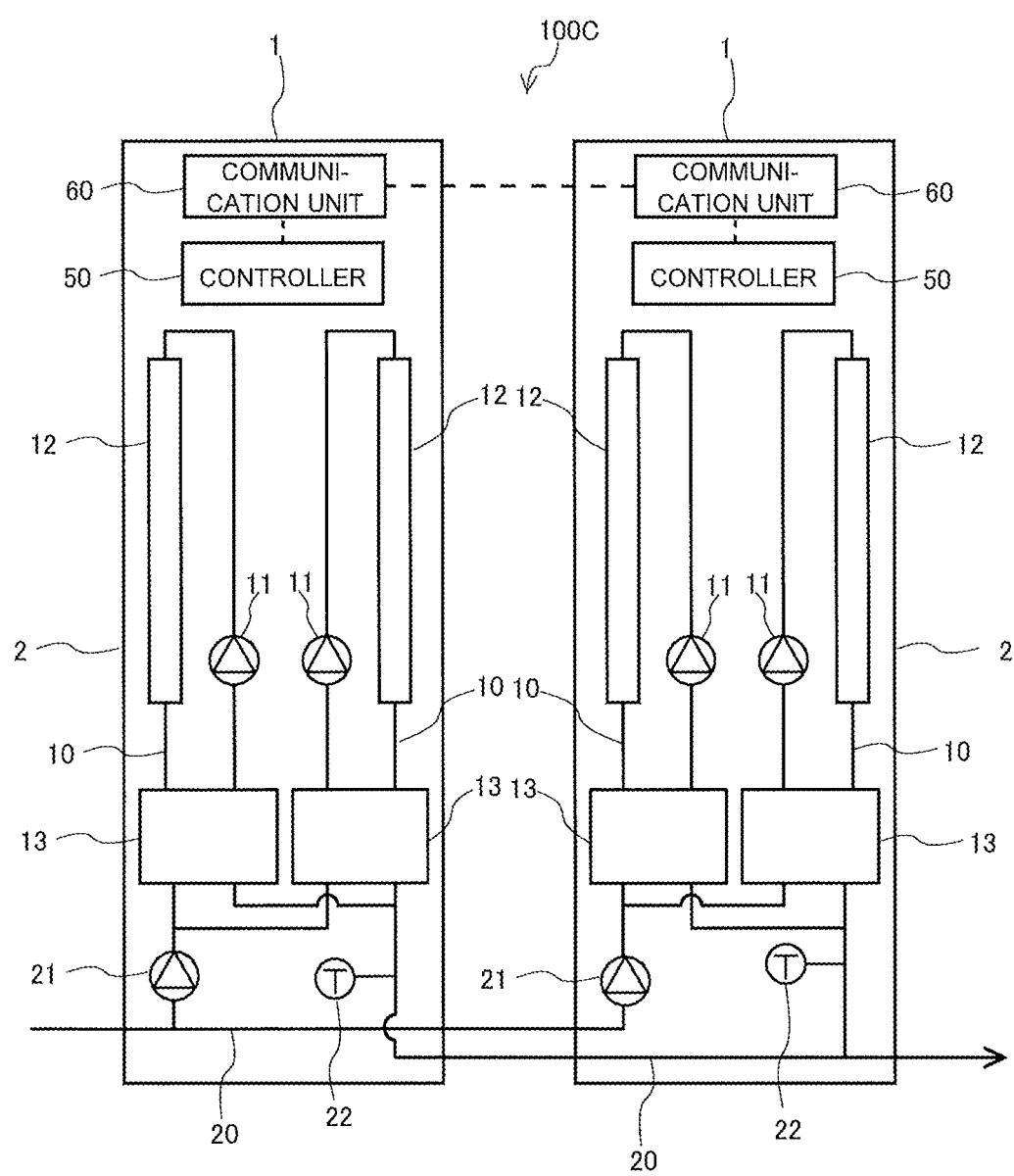
FIG. 5 is a configuration diagram of a third modification of the free cooling system according to Embodiment of the present disclosure.

The configuration of the free cooling system 100 shown in FIG. 2 is of a standard type, and the configuration of the free cooling system 100A shown in FIG. 3 is of a type that the load pumps are housed. Further, the configuration of the free cooling system 100B shown in FIG. 4 is of a type that the load pipes are housed, and the configuration of the free cooling system 100C shown in FIG. 5 is of a type that the load pumps and the load pipes are housed.

The heat medium pump 11 is provided for pressurizing the heat medium in the heat medium circuit 10 and for transferring the heat medium in the circuit. For example, the heat medium pump 11 is of a type that includes an inverter circuit, and that can vary a flow rate by changing the rotation speed of the pump. The first heat exchanger 12 is provided for causing heat exchange to be performed between the heat medium and air sent from the fan 3 to cool the heat medium. The second heat exchanger 13 is provided for causing heat exchange to be performed between the heat medium and the load heat medium flowing through the load pipe 20 to cool the load heat medium.

The load pump 21 is provided for pressurizing the load heat medium in the load pipe 20 and for transferring the load heat medium. For example, the load pump 21 is of a constant rate type in which a rotation speed is constant. In the case of the configuration shown in FIG. 2 or FIG. 4, this load pump 21 is controlled by one controller 50 (hereinafter referred to as "main controller 50") selected in advance from the plurality of controllers 50. In the case of the configuration shown in FIG. 3 or FIG. 5, each load pump 21 is controlled by the corresponding controller 50 housed in the same housing 2 as the load pump 21.

The controller 50 is provided for controlling the rotation speed and on/off of each heat medium pump 11, the rotation speed of the fan 3, the rotation speed and on/off of the load pump 21, transmission and reception of the communication unit 60 and the like. The controller 50 is, for example, dedicated hardware or a central processing unit (also referred to as a CPU, a processing unit, an arithmetic unit, a microprocessor, a microcomputer, or a processor) that executes a program stored in a memory.

The communication unit 60 is provided for performing communication with another communication unit 60 provided to another free cooling outdoor unit 1. It is sufficient for the communication unit 60 to have the configuration that allows transmission and reception of information between the communication unit 60 and another communication unit 60. The transmission and reception of information may be performed via wired communication that uses an electric wire, an optical fiber or other wire, or may be performed via wireless communication that uses a wireless LAN and BLUETOOTH (registered trademark). The communication unit 60 may be included by the controller 50 instead of being separated from the controller 50.

Each of the free cooling outdoor units 1 includes, in the housing 2, a load temperature detection sensor 22 that detects the temperature of the load heat medium flowing through the load pipe 20, and this load temperature detection sensor 22 is provided to the load pipe 20 at least at a position near the outflow side of the free cooling outdoor unit 1 through which the load heat medium flows out from the free cooling outdoor unit 1. This load temperature detection sensor 22 may be a thermistor, for example. The load temperature detection sensor 22 may be provided outside the housing 2.

Figure 6:
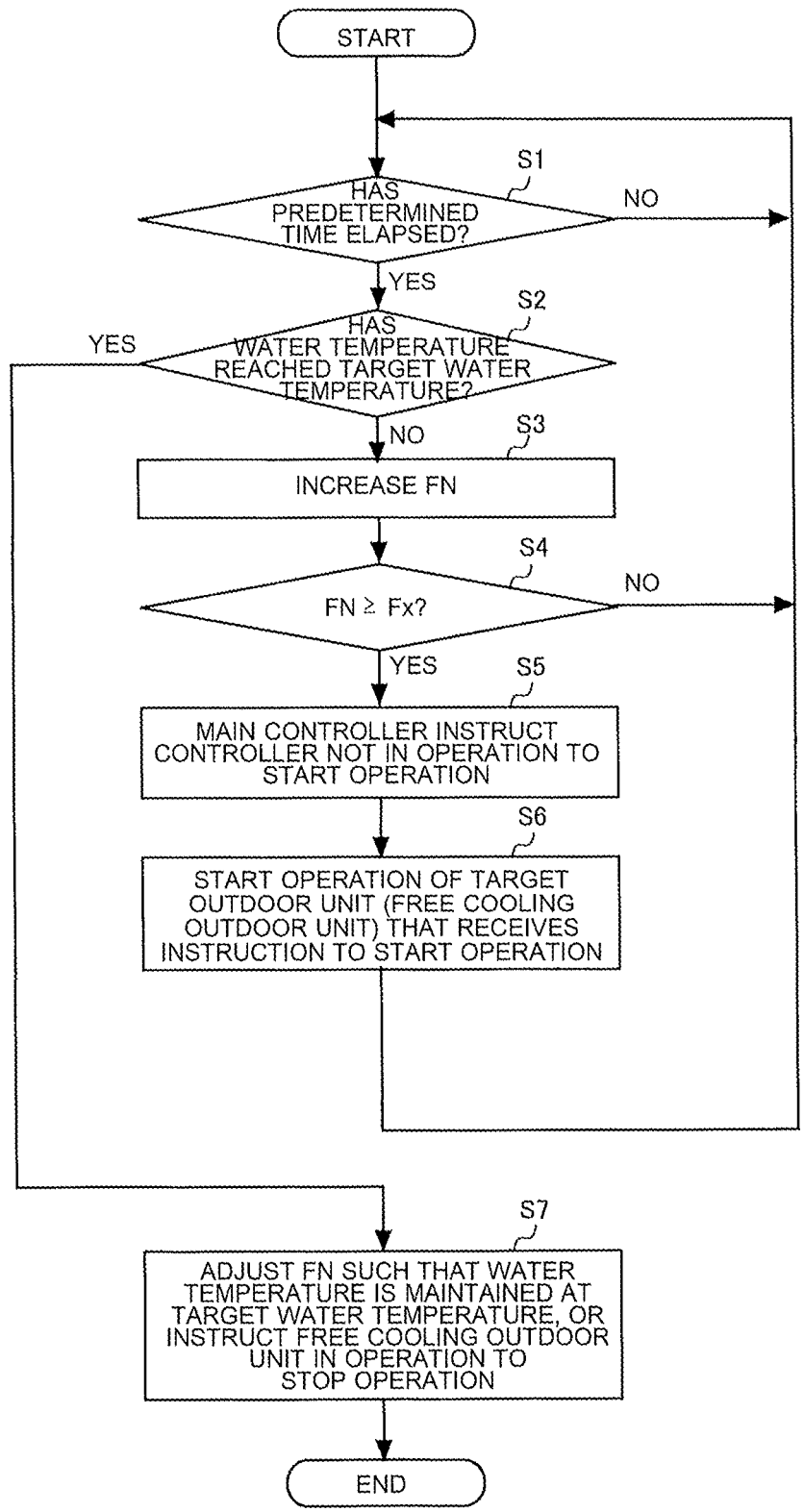
FIG. 6 is a flowchart showing the action of the free cooling system according to Embodiment of the present disclosure.

FIG. 6 is a flowchart showing the action of the free cooling system 100 according to Embodiment of the present disclosure.

Next, the action of the free cooling system 100 according to Embodiment will be described with reference to FIG. 6. Hereinafter, the description will be made for the case where control of increasing the number of free cooling outdoor units 1 operated according to a load is performed.

When the free cooling system 100 starts the operation, for example, the operation of one of the free cooling outdoor units 1 is started. At this point of operation, the operations of other free cooling outdoor units 1 are stopped.

Step S1

The main controller 50 counts a time period, and determines whether or not a predetermined time set in advance has elapsed. When the main controller 50 determines that the predetermined time has elapsed, the processing proceeds to step S2. Whereas when the main controller 50 determines that the predetermined time has not elapsed, the processing in step S1 is performed again.

Step S2

The controller 50 of the free cooling outdoor unit 1 in operation determines, based on a temperature detected by the load temperature detection sensor 22 housed in the same housing 2 as the controller 50, whether or not the temperature of a load heat medium reaches a target temperature set in advance. When the controller 50 of the free cooling outdoor unit 1 in operation determines that the temperature of the load heat medium reaches the target temperature, the processing proceeds to step S7. Whereas when the controller 50 of the free cooling outdoor unit 1 in operation determines that the temperature of the load heat medium does not reach the target temperature, the processing proceeds to step S3.

Step S3

The controller 50 of the free cooling outdoor unit 1 in operation increases a driving frequency FN of each heat medium pump 11 housed in the same housing 2 as that of the controller 50. For example, the driving frequency FN of the heat medium pump 11 housed in the same housing 2 as that of the controller 50 may be increased by a value set in advance, that is, by a fixed value, or may be increased by a value corresponding to the difference between the temperature of the load heat medium and the target temperature, that is, by a variable value.

Step S4

The controller 50 of the free cooling outdoor unit 1 in operation determines whether or not the driving frequency FN of each heat medium pump 11 housed in the same housing 2 as the controller 50 is a reference driving frequency Fx (maximum driving frequency, for example) set in advance. When the controller 50 of the free cooling outdoor unit 1 in operation determines that the driving frequency FN of the heat medium pump 11 housed in the same housing 2 as that of the controller 50 is equal to or more than the reference driving frequency Fx, the processing proceeds to step S5. Whereas when the controller 50 of the free cooling outdoor unit 1 in operation determines that the driving frequency FN of the heat medium pump 11 housed in the same housing 2 as that of the controller 50 is less than the reference driving frequency Fx, the processing returns to step S1.

Step S5

The main controller 50 instructs, via the communication units 60, the controller 50 of one of the free cooling outdoor units 1 not in operation to start the operation of the free cooling outdoor unit 1.

Step S6

In response to the reception of the instruction to start the operation, the controller 50 of the free cooling outdoor unit 1 starts the operation of the target outdoor unit.

Step S7

The controller 50 of the free cooling outdoor unit 1 in operation adjusts the driving frequency FN of each heat medium pump 11 housed in the same housing 2 as that of the controller 50 such that the temperature of the load heat medium is maintained at the target temperature. Alternatively, the controller 50 of the free cooling outdoor unit 1 in operation instructs the free cooling outdoor unit 1 in operation to stop the operation. Specifically, the controller 50 of the free cooling outdoor unit 1 in operation maintains the driving frequency FN of each heat medium pump 11 housed in the same housing 2 as that of the controller 50 during a period where the temperature of the load heat medium falls within a predetermined range from the target temperature. Alternatively, the controller 50 of the free cooling outdoor unit 1 in operation stops the operation of the free cooling outdoor unit 1. When the temperature of the load heat medium falls outside the predetermined range from the target temperature, the controller 50 of the free cooling outdoor unit 1 in operation varies the driving frequency FN of each heat medium pump 11 housed in the same housing 2 as that of the controller 50. At this point of operation, when the temperature of the load heat medium rises and exceeds the upper limit of the predetermined range, the controller 50 of the free cooling outdoor unit 1 in operation reduces the driving frequency FN of each heat medium pump 11 housed in the same housing 2 as that of the controller 50. Whereas when the temperature of the load heat medium falls and becomes lower than the lower limit of the predetermined range, the controller 50 of the free cooling outdoor unit 1 in operation increases the driving frequency FN of each heat medium pump 11 housed in the same housing 2 as that of the controller 50.

In this manner, the processing is performed in such a manner that the load heat medium flowing through the load pipes 20 has the target temperature.

As described above, in the free cooling system 100 according to Embodiment, the free cooling outdoor units 1 are operated at least one by one, and the respective free cooling outdoor units 1 are linked by the communication units 60 and hence, the number of free cooling outdoor units 1 operated can be changed according to a load. Therefore, fine control can be performed according to a load and hence, energy saving can be achieved.

In step S5, the main controller 50 instructs the controller 50 of one of the free cooling outdoor units 1 not in operation to start the operation of the free cooling outdoor unit 1. However, the configuration is not limited to the above. The main controller 50 may instruct the controllers 50 of some of the free cooling outdoor units 1 not in operation to start the operation of the free cooling outdoor units 1.

As described above, the free cooling system 100 according to Embodiment includes the plurality of free cooling outdoor units 1 each including the heat medium circuits 10, the controller 50, and the communication unit 60, each heat medium circuit 10 being configured by connecting the heat medium pump 11, the first heat exchanger 12, and the load side of the second heat exchanger 13 by the pipes, brine, for example, circulating through the heat medium circuit 10, the controller 50 controlling the heat medium pumps 11, and the communication units 60 performing communication with each other. The respective free cooling outdoor units 1 are coupled with each other by the load pipes 20 that allow the load heat medium to flow to or flow out from the load side of each second heat exchanger 13.

The free cooling system 100 according to Embodiment includes the plurality free cooling outdoor units 1, and the respective free cooling outdoor units 1 communicate with each other via the communication units 60. Therefore, fine control can be performed according to a load and hence, energy saving can be achieved.

The description has heretofore been made for setting where the number of free cooling outdoor units 1 operated is changed according to a load. However, the free cooling system may have setting where all of the free cooling outdoor units 1 are operated irrespective of a load.

REFERENCE SIGNS LIST

1 free cooling outdoor unit, 2 housing, 3 fan, 10 heat medium circuit, 11 heat medium pump, 12 first heat exchanger, 13 second heat exchanger, 20 load pipe, 21 load pump, 22 load temperature detection sensor, 50 controller, 60 communication unit, 100 free cooling system, 100A free cooling system, 100B free cooling system, 100C free cooling system.

The invention claimed is:

1. A free cooling system comprising a plurality of free cooling outdoor units each including a heat medium circuit, a controller, and a communication circuit, each heat medium circuit being configured by connecting a heat medium pump, a first heat exchanger, and a heat source side of a second heat exchanger by pipes, wherein a heat medium circulates through each heat medium circuit, each controller is configured to control the corresponding heat medium pump of the respective heat medium circuit, and the communication circuits perform communication with each other; wherein the free cooling outdoor units are coupled with each other by a load pipe that allows a load heat medium to flow to or flow out from a load side of each of the second heat exchangers; and each of the plurality of free cooling outdoor units includes a load temperature detection sensor configured to detect a temperature of the load heat medium flowing through the load pipe; wherein in a case where less than all of the plurality of free cooling outdoor units are in operation, in each of the plurality of free cooling outdoor units in operation, the corresponding controller increases heat medium pump driving frequency in a case where the controller determines that the temperature detected by the load temperature detection sensor has not reached a target temperature set in advance, and in a case where the driving frequency of the heat medium pump of the free cooling outdoor units in operation is equal to or more than a reference driving frequency set in advance, a main controller that is one selected in advance from a plurality of the controllers instructs, via a corresponding communication circuit, the controller of at least one of the plurality of free cooling outdoor units not in operation to start operating.

2. The free cooling system of claim 1, wherein the controller of the at least one of the plurality of tree cooling outdoor units not in operation starts to drive its corresponding heat medium pump upon reception of the instruction to start the operation.

* * * * *